(12) United States Patent
De La Roij

(10) Patent No.: US 7,837,787 B2
(45) Date of Patent: Nov. 23, 2010

(54) CONSTRUCTION COMPOSITION AND METHOD FOR MAKING A CONSTRUCTION PRODUCT

(75) Inventor: Robin De La Roij, Dordrecht (NL)

(73) Assignee: Mega-Tech Holding B.V., Moerdijk (NL)

( * ) Notice: Subject to any disclaimer, the term of this patent is extended or adjusted under 35 U.S.C. 154(b) by 971 days.

(21) Appl. No.: 10/592,367

(22) PCT Filed: Mar. 12, 2004

(86) PCT No.: PCT/NL2004/000182

§ 371 (c)(1),
(2), (4) Date: Jan. 5, 2007

(87) PCT Pub. No.: WO2005/087687

PCT Pub. Date: Sep. 22, 2005

(65) Prior Publication Data

US 2008/0229978 A1    Sep. 25, 2008

(51) Int. Cl.
  *C04B 18/06* (2006.01)
(52) U.S. Cl. .................. 106/705; 106/DIG. 1
(58) Field of Classification Search ............. 106/705, 106/DIG. 1
See application file for complete search history.

(56) References Cited

U.S. PATENT DOCUMENTS 5,242,603 A    9/1993    Fan
5,577,865 A    11/1996   Manrique et al.

FOREIGN PATENT DOCUMENTS

| GB | 1 069 657 | 5/1967 |
| GB | 1 312 079 | 11/1973 |
| GB | 1 592 001 | 7/1981 |
| WO | 02/48067 | 6/2002 |

OTHER PUBLICATIONS

Database WPI Section Ch, Week 199834 Derwent Publications Ltd., London, GB Class L02 1998-396820 & Ru 2 101 251 C1 Jan. 10, 1987.
Patent Abstract of Japan vol. 0171, No. 24 (Mar. 16, 1993) & JP 4 305044 (Kubota Corp) (Oct. 28, 1992).
Database WPI Section Ch, Week 200119 Derwent Publications Ltd., London, GB & CN 1 271 698 (Nov. 1, 2000).
Database WPI Section Ch, Week 197946 Derwent Publications Ltd., London, GB & JP 54 128477 (Oct. 5, 1979).

*Primary Examiner*—Paul Marcantoni
(74) *Attorney, Agent, or Firm*—Young & Thompson

(57) ABSTRACT

A construction composition includes: an ash in an amount of 90.0-99.9 wt. %, based on the total weight of the construction composition, wherein the ash is fly ash or bottom ash; an additive composition in an amount of 0.1-10.0 wt. %, based on the total weight of the construction composition, wherein the additive composition includes a component from group (2a) and a component from group (2b), wherein group (2a) consists of metal chlorides and wherein group (2b) consists of silica, zeolite and apatite, and wherein group (2a) includes 70.0-99.0 wt. % of the total additive composition and group (2b) comprises 1.0-30.0 wt. % of the total additive composition; and cement, in an amount of 0.0-5.0 wt. %, based on the total weight of the construction composition. With this composition, fly ash can be used as construction material, having properties comparable or better than concrete.

19 Claims, No Drawings

CONSTRUCTION COMPOSITION AND METHOD FOR MAKING A CONSTRUCTION PRODUCT

This invention is related to a construction composition and a method for making a construction product.

In plants utilizing coal as a power source, such as black coal-fired burners, powder coal electricity plants, etc. large amounts of fly ash are generated and escape to the atmosphere, and thus, may cause polluting effects. Accordingly, it has been tried to solve this pollution problem by reusing industrial waste materials and measures have been undertaken to reuse as much fly ash as possible. Ashes, depending upon the kind of ash, can be reused, e.g. as filler material in cement, as filler material in dykes etc.

However, a disadvantage is that only limited amounts of fly ash can be used in such applications. For example, in order not to lose the construction properties of cement (like strength. etc.), fly ash can only be added to an amount of 30 wt. % of the cement. As described in e.g. U.S. Pat. No. 487,283 (for injection a lime-fly ash composition) and WO0248067 (immobilizing fly ash with cement), in order to obtain the desired properties, cement always has to be present. When used as asphalt filler, only about 30 wt. % of this filler may consist of fly ash, next to cement.

A further disadvantage is that when fly ash is used (only fly ash or in combination with cement), usually large amounts of lime are necessary, as described in e.g. U.S. Pat. No. 487,283 (10-300 wt. % lime) and U.S. Pat. No. 5,951,751 (30-50 wt. % lime). When e.g. stabilizing bottom materials like sludge, peat etc. (especially those bottom materials containing large amounts of water), with fly ash and cement, or with fly ash and large amounts of lime, bad construction properties may be obtained or e.g. long setting times are required.

It is therefor an object of the invention to provide a composition that can be used in construction applications, e.g. in combination with bottom materials, wherein this composition allows the use of the large amounts of ash, especially fly ash, while nonetheless maintaining good construction properties. In another aspect of the invention, it is an object of the invention to provide a construction product, based on bottom material and this construction composition. In yet another aspect of the invention, it is an object of the invention to provide a method for making a construction product with large amounts of ash, while having good construction properties.

Surprisingly, it has been found that a construction composition comprising ash and an additive, wherein the additive comprises chlorides and oxides, has very good construction properties, even in the complete absence of cement. In some cases, this construction composition may even provide better construction properties than state of the art compositions based on cement (cement only or cement and ash). This means, that by applying this construction composition, it is now possible to use ash as a construction material, with the same or better properties than with only cement, or with cement and ash as filler material. Hence, according to the invention, ash is not merely a filler material, but, in combination with an additive, ash can provide a construction composition, which can e.g. be used for consolidating bottom material selected from the group consisting of soil, sand, sludge, gangue, mud, peat, loam and clay, etc.

According to the invention, the construction composition can be used as mortar (mortar concrete), for consolidating radioactive material, breaker sand, furnace slags (like high blast furnace slags) and minerals. Examples are e.g. asphalt granulate cement (AGRAC), asphalt granulate emulsion (AGREM), asphalt granulate emulsion cement (AGREC) or as mixture of milled porous asphalt granualte (porous asphalt, i.e asphalt that effectively drains off rain water), natural sand, cement and water (FAGREC application).

According to the invention, there is provided a construction composition comprising: an ash in an amount of 90.0-99.9 wt. %, based on the total weight of the construction composition, wherein the ash is fly ash or bottom ash;

an additive composition in an amount of 0.1-10.0 wt. %, based on the total weight of the construction composition, wherein the additive composition comprises a component from group (2a) and a component from group (2b), wherein group (2a) consists of metal chlorides and wherein group (2b) consists of silica, zeolite and apatite, and wherein group (2a) comprises 70.0-99.0 wt. % of the total additive composition and group (2b) comprises 1.0-30.0 wt. % of the total additive composition; and cement, in an amount of 0.0-5.0 wt. %, based on the total weight of the construction composition.

The use of a similar additive composition as used in the invention is known from WO0248067 as cement improver. WO0248067 discloses that cement products based on cement and such an additive composition have superior characteristics with respect to prior cement products (without such an additive composition). It is also taught in WO0248067 that such cement can bind polluted soil or fly ash. When immobilizing fly ash, 1.7-3 kg of additive composition is used per $m^3$ of material to be treated, in combination with the addition of 100-250 kg of cement per $m^3$ of material. Assuming a density of the ash of about 800-1500 $kg/m^3$, this means that, based on the amount of ash, cement has to added in an amount of about 6.5-30 wt. % (since cement is the basic building component) and 0.1-0.4 wt. % of the additive composition of WO0248067.

However, according to the present invention, ash, especially ash from incineration plants, in combination with a small amount of additive composition, is used as construction material itself and cement is not necessarily present anymore, or is at least present in substantially smaller amounts (0.0-5.0 wt. %, based on the total weight of the construction composition) than according to the state of the art methods (6.5-30 wt. %). In an embodiment of the invention, the invention is directed to a construction composition, wherein the amount of cement is 0.0-3.0 wt. % of the total construction composition. In a variation on this embodiment, the composition according to the invention is a construction composition, containing no cement.

The ash of the invention can e.g. be a fly ash or bottom ash, e.g. from incineration plants. For example, the ash can be E-bottom ash, an ash that is released form electricity plants based on powder coal. This bottom ash is released as "heavy" ash particles. The material is a burnt, dehydrated clay, having a brown-black color. One can distinguish between porous (sintered) and dense (molten) E-bottom ash granules. The density is about 780-800 $kg/m^3$ for loosely poured ash and 950-1500 $kg/m^3$ for densified E-bottom ash. The elasticity modulus is about 100-200 $N/mm^2$. The ash can also be E-fly ash, also released form electricity plants based on powder coal. With electrostatic filters, E-fly ash (and E-bottom ash) is separated from the exhaust. The density is about 800-1150 $kg/m^3$ for loosely poured ash and 1100-1500 $kg/m^3$ for densified E-fly ash. In an embodiment of the invention, the invention is directed to a construction composition, wherein the ash comprises fly ash, and especially a construction composition, wherein the ash comprises powder coal fly ash (PFA). When using PFA, a construction product with excellent properties like strength etc. can be obtained.

With construction composition in the context of the invention is referred to a composition that can be used for making constructions or construction products like consolidations, roads, etc. The construction composition can however also be used to make smaller construction products like granules, blocks, bricks, kerbs etc. Further, the construction composition can also be used e.g. as filler for minings binder, for waste material, for binding toxic materials, like e.g. those present in slag, as grout for injection or inoculation.

In an embodiment of the invention, the construction composition comprises an additive composition, wherein the metal chloride is selected from the group consisting of sodium chloride, potassium chloride, magnesium chloride, calcium chloride, strontium chloride, barium chloride, ammonium chloride and aluminium chloride. Especially these ldnds of metal chlorides give good results in the construction composition of the invention. The metal chlorides can be used alone or in combination. For example, according to a variation on this embodiment, the construction composition comprises an additive composition, wherein the metal chloride comprises sodium chloride and calcium chloride, which means that the additive composition comprises at least these two metal chlorides. In yet another variation, the additive composition further comprises aluminum chloride. In a yet a further embodiment of the invention, the invention is directed to a construction composition comprising an additive composition, wherein the metal chloride comprises sodium chloride, potassium chloride, magnesium chloride, calcium chloride, ammonium chloride and aluminium chloride.

In another embodiment of the invention, the construction composition comprises an additive composition, wherein group (2b) comprises zeolite, or a combination of zeolites. For example, this can be a zeolite selected from the group consisting of fibrous zeolites, zeolites with doubly-connected 4-ring chains, zeolites with 6-rings, zeolites with 8, 10 and/or 12 rings, like those of the mordenite group, zeolites of the Heulandite Group, Coislesite, Goosecreekite, Partleite, etc. The person skilled in the art can find other zeolites than those mentioned above, for application in the construction composition. Zeolites may be of natural or synthenic origin. Preferably, synthetic zeolite is used. Combinations of zeolites are also possible.

In yet another embodiment of the invention, the construction composition comprises an additive composition, wherein group (2b) comprises silica. Also combinations of silica and zeolite can be used. In a further embodiment, next to the chlorides of group (2a) and the oxides of group (2b), the additive composition may further comprise a component selected from the group consisting of magnesium oxide and calcium oxide.

The additive composition of the invention may for example be a composition similar to the composition which is intend for use as an additive for cement according to WO0248067 (which is herein incorporated by reference), which contains:
 a. sodium chloride, potassium chloride, magnesium chloride, calcium chloride, strontium chloride, barium chloride and/or ammonium chloride;
 b. aluminum chloride; and
 c. silica and/or zeolite and/or apatite.

Group a. of components in the composition relates to the known alkali metal and alkaline earth metal chlorides. Of these, a combination of sodium chloride and calcium chloride is most preferred. In particular, the composition according to the invention contains a combination of sodium chloride, potassium chloride, magnesium chloride, calcium chloride and ammonium chloride. Group b. is composed of aluminum chloride. Aluminum chloride is preferred, but may also be partially replaced by other chlorides of trivalent metals, such as iron (III) chloride. Group c. is composed of silica or zeolite. The zeolites used are preferably zeolites based on a combination of aluminum and silicon.

If appropriate, the amorphous $SiO_2$ can be replaced by apatite or a combination of zeolites or a zeolite composite, in particular a zeolite composite comprising natural zeolite (45%), alkali feldspar (32%), agriniaugite (10%), wollastonite (9%), calcite (1%), gotzenite (1%), melanite, apatite, titanite (2%).

In addition to the components from groups a., b. and c. referred to above, components from group d., namely magnesium oxide and/or calcium oxide, are preferably also present in the mixture. A preferred composition comprises at least sodium chloride, potassium chloride, magnesium chloride, calcium chloride, ammonium chloride, aluminum chloride, magnesium oxide, silica and/or zeolite.

Furthermore, there may also be present a component from group e. magnesium hydrogen phosphate and/or a component from group f., consisting of magnesium sulfate and sodium carbonate. The overall composition advantageously may contain a combination of components comprising:
 a. sodium chloride, potassium chloride, ammonium chloride, magnesium chloride and calcium chloride
 b. aluminum chloride
 c. silica
 d. magnesium oxide
 e. magnesium monohydrogen phosphate
 f. magnesium sulfate and sodium carbonate.

When these components are combined, the result is a composition which contains the following components in quantities, based on the total quantity of these components in the additive composition:
10 to 55% by weight of sodium chloride
5 to 40% by weight of potassium chloride
0.5 to 5% by weight of ammonium chloride
5 to 40% by weight of magnesium chloride
5 to 45% by weight of calcium chloride
1 to 15% by weight of aluminum chloride
0.5 to 10% by weight of silica
0.2 to 8% by weight of magnesium oxide
1.5 to 10% by weight of magnesium hydrogen phosphate
1.5 to 8% by weight of magnesium sulfate
1 to 10% by weight of sodium carbonate, based on the total weight of the composition, and wherein the metal chlorides in the composition comprise about 70.0-99.0 wt. % of the total additive composition, and wherein the oxides (where applicable magnesium oxide, silica) of the composition comprise about 1.0-30.0 wt. % of the total additive composition.

In another embodiment, the invention is directed to a construction composition, wherein the additive composition comprise 80.0-99.0 wt. % metal chlorides of the total additive composition, and the oxides of the composition comprise about 1.0-20.0 wt. % of the total additive composition. In yet another embodiment, the metal chlorides comprises 85.0-99.0 wt. % of the total additive composition, and the oxides of the composition comprise about 1.0-15.0 wt. % of the total additive composition.

When these components are combined, the result is a composition which contains the following components in quantities, based on the total quantity of these components in the additive composition:
10 to 55% by weight of sodium chloride
5 to 40% by weight of potassium chloride 0.5 to 5% by weight of ammonium chloride
5 to 40% by weight of magnesium chloride
5 to 45% by weight of calcium chloride
1 to 15% by weight of aluminum chloride
0.5 to 10% by weight of zeolite (or combination of zeolites)
0.2 to 8% by weight of magnesium oxide
1.5 to 10% by weight of magnesium hydrogen phosphate
1.5 to 8% by weight of magnesium sulfate
1 to 10% by weight of sodium carbonate, based on the total weight of the composition, and wherein the metal chlorides in the composition comprise about 70.0-99.0 wt. % of the total additive composition, and wherein the oxides (where applicable magnesium oxide, zeolite) of the composition comprise about 1.0-30.0 wt. % of the total additive composition.

In another embodiment, the invention is directed to a construction composition, wherein the additive composition comprise 80.0-99.0 wt. % metal chlorides of the total additive composition, and the oxides of the composition comprise about 1.0-20.0 wt. % of the total additive composition. In yet another embodiment, the metal chlorides comprises 85.0-99.0 wt. % of the total additive composition, and the oxides of the composition comprise about 1.0-15.0 wt. % of the total additive composition.

The additive composition for the construction composition of the invention can be prepared by combining the abovementioned components and dry-mixing them. The additive composition according to the invention is preferably assembled from the abovementioned components in pure form (>97%). If appropriate, salts including bound water of crystallization, are incorporated to facilitate processing. Suspensions based on the composition described above have a pH of between approx. 8-13.5 (1 part composition and 20 parts water, T=16.8° C.). This high pH is highly advantageous if soil which is contaminated with organic acids is to be stabilized or immobilized.

In another aspect, the invention is directed to a method for making a construction composition comprising:

providing an ash, wherein the ash is fly ash or bottom ash;

providing an additive composition, wherein the additive composition comprises a component from group (2a) and a component from group (2b), wherein group (2a) consists of metal chlorides and wherein group (2b) consists of silica, zeolite and apatite, and wherein group (2a) comprises 70.0-99.0 wt. % of the total additive composition and group (2b) comprises 1.0-30.0 wt. % of the total additive composition; such that the weight of the ash is 90.0-99.9 wt. %, based on the total weight of the construction composition and the weight of the additive composition is 0.1-10.0 wt. %, based on the total weight of the construction composition;

mixing the ash and the additive composition.

This method advantageously provides a construction composition according to the invention. This construction composition, which is obtainable by the above-mentioned method, may further be used to make a construction product according to the invention, e.g. by a method for making a construction product, comprising:

providing a bottom material selected from the group consisting of soil, sand, sludge, gangue, mud, peat, loam and clay;

providing a construction composition according to any one of claims 1-8 in an amount such that the weight of the construction composition comprises 10-95 wt. % (wet weight) of the bottom material;

mixing the bottom material and the construction composition; drying the mixture obtained in step (3).

In an embodiment of the method for making a construction product, before or during mixing, one may also add a small amount of cement. This may e.g. be used to obtain a faster consolidation or hardening of the of construction product. Hence, the invention is also directed to a method for making a construction product, wherein cement is added to the mixture obtained in step (3) in an amount such that the weight of the cement comprises 0.5-10 wt. % (wet weight) of the mixture obtained in step (3), for example wherein the weight of the cement comprises 3-5 wt. % (wet weight) of the mixture obtained in step (3). This method provides a construction product, comprising a mixture of the construction composition, and a bottom material selected from the group consisting of soil, sand, sludge, gangue, mud, peat, loam and clay. This construction product, e.g. obtainable by above-mentioned method for making a construction product, may be a construction product having a compressive strength of at least 1.2 N/mm2 (which was e.g. obtained in the field. In the lab, a value of even 1.5 N/mm$^2$ was obtained).

In a preferred embodiment, the construction composition is added in the method for making a construction product, such that the weight of the construction composition comprises 10-90 wt % (wet weight) of the bottom material, e.g. 10-80 wt. %.

Hence, the invention provides a construction composition and a construction product, which can advantageously be used for consolidating bottom material selected from the group consisting of soil, sand, sludge, gangue, mud, peat, loam and clay, thereby not only binding fly ash, but also using fly ash in the substantial absence of cement as construction material, providing physical properties of the resulting construction product which are similar, or better, or are obtained in a shorter time frame than when making construction product based on e.g. cement according to state of the art methods. Further, pollutants in the ash, or in the bottom material, are advantageously bound.

The person skilled in the art will understand that in the method for making a construction composition and in the method for making a construction product, one may vary the sequence of adding the chlorides of group (2a), the oxides of group (2b), and where applicable cement and bottom material respectively. One may also have a number of mixing steps, e.g. before the addition of a new component, etc.

EXAMPLE 1

Peat/Sandy Soil

Peat (wet) 1750.00 gram (Lab 70 wt. %=mass/mass) (field quantity is slight different and is determined on 70 vol. %=volume mass 0.7 m$^3$) and sandy loam (wet) 750.00 gram (Lab 30 wt. %) (field quantity is slight different and is determined on 30 vol. %=volume mass=0.3 m$^3$) are mixed. This makes a peat/loam bottom material sample (wet) of 2500.00 gram (approx. 1.8 dm$^3$).

To the bottom material sample, an additive composition of 16.2 gram was added, the additive composition comprising a composition according to example 5b, and 450.00 gram PFA (18 wt. % related to wet base material) (PFA=Powder coal fly ash). The additive composition and the bottom material are mechanically mixed for a few minutes. A proctor cylinder sample was made. The proctor sample had a wet density of 1220 g/dm$^3$ and was extremely plastic after preparation due to the extreme high water content of the soil samples.

The wet density of both soil samples in composition (70:30) was determined at approx. 1360 g/dm$^3$. Mechanical compaction was only partly possible and to a certain extend. The water content in the mixed peat sample (70 vol. %peat:30 vol. % sandy loam) is 67 wt. % due to 100 wt. % sample. The water content is determined in an incubator by 110° C. during 1 hour. The solid "organically" fraction is 33 wt. %. The wet density of the construction composition modified soil mix is determined at 1220 g/dm$^3$. The mixed material showed before adding the construction composition 17° C.; afterwards, when mixing, the temperature raised up to 23° C.

The useful macro composition in this experiment is determined on about 0.5-2.5 kg additive composition+100-500 kg PFA/m$^3$ bulk material. The bulk weight of 70 vol. % peat+30 vol. % sandy loam is determined on 1300 kg/m$^3$. Slight differences could be noticed referring soils from other spots due to the heterogeneous character of the soil and the specific different water content in the field.

The extreme high water content is an additional negative factor which delays the hydration time. It is possible to increase the hydration time by increasing PFA (30-50 vol. %) or a slight percentage of cement (3-5 wt. %). This are possibilities which may be taken into account when construction under disadvantageous circumstances, e.g. when using extreme wet and/or high organically bottom material. In normal sandy soil and under normal circumstances approx. 1-2 kg additive composition: 100-200 kg PFA can be used for obtaining the required strength due to RAW Standard 1995-NL.

The end product will have excellent physically/mechanically characteristics after the hydration period. It is e.g. possible to make 5-10000 m$^2$ stabilization per day. When using for roads with an additional asphalt top, the asphalt on top can be diminished to about ⅔ or even about ⅓, referring to classical design with using large amounts of cement and only small amounts of fly ash as filler material.

Physical tests were performed by measuring UCS MTE Lab with compressing speed 0.1 MPa/sec. Axial compression strength in N/mm$^2$ and flexural strength in N/mm$^2$ were measured. These techniques are known to the person skilled in the art and are e.g. described in "Standaard RAW Bepalingen", from the "Centrum voor Regelgeving en Onderzoek in Grond-, Water-en Wegenbouw en de Verkeerstechniek" from 1995, e.g. pages 64-68).

A soak test was performed: After 24 hours complete water soak the 72 hour sample with a weight of 131.4 g showed after 24 hours (total age 96 hours) a weight of 136 g. An increase of 4.6 g (3.5 wt. %) caused by water absorption. The PFA-additive composition modified sample is stored completely under water for 24 hours soak after 3 day's of hardening. The normal soak test soak after 3, respectively 7 days whereby the sample is in contact with just the lower part and a membrane between. The size of the sample was 62.5 mm×40 mm×40 mm. This sample is than subsequently disposed to frost test with −20° C./+20° C. cycles of 24 hours for 9 days. It showed then a 5 vol. % shrinking; usually such samples desintegrate after these test, but the sample according to the invention did not.

A proctor after a 14 days hardening (drying, in this case by 20° C./65% humidity), has a dry density of 985 g/dm$^3$ (19.26 wt. % has been dehydrated). After soaking this proctor for 24 hours completely under water, a mass if found of 1215 g. The proctor has absorbed 23.3 wt. % water.

Below, results on some samples with respect to compressive strength and the flexural strength are given:

| Product Code | UCS (N/mm$^2$) | Flexural strength (N/mm$^2$) | Density (g/dm$^3$) |
|---|---|---|---|
| Alfa-Pl-01 (3 days) | 0.6 | — | 1220 (wet) |
| Alfa-Pl-02 (6 days) | 0.8 | — | — |
| Alfa-Pl-03 (14 days) | 1.2 | 0.3 | 985 (dry) |

According the Dutch RAW Standard 1995 following minimum requirements for road infrastructure are applicable; in the laboratory 1.5 N/mm$^2$ after 28 days; drilled samples in the field 1.2 N/mm$^2$ after 28 days.

EXAMPLE 2

Peat/Sandy Soil

A mix of 50 vol. % peat:50 vol. % sandy soil was made. The water content from the peat & the sandy soil were determined separately by taking from both samples of 25 gram and storing these samples in an incubator by a T=110° C. during 4 hours. The peat finalized with a weight of 0.5 gram and the sandy soil with 8.1 gram. The peat contains 98 wt. % water and the sandy soil 67.6 wt. % on base of 100 wt. % base material. The water content of the both soils mixed with each other is determined at 82.8 wt. % with a solid partly "organically" fraction of 17.2 wt. %. The incubator is specially developed for this type of investigation and works on warm/heat air which circulates around by convection.

Peat (wet) 1830.00 gram (Lab 50 vol. %=Volume/mass) (the peat shows in wet condition containing 98 wt. % a density of 1830 g/dm$^3$) and sandy loam (wet) 1050.00 gram (Lab 50 vol. %) (the sandy loam shows in wet condition containing 67.7 wt. % water a density of 1050 g/dm$^3$) are mixed. This makes a peat/loam sample (wet) 2880.00 gram (1440 g/dm$^3$ wet density mixed soils (50:50)). To the bottom material 18.00 additive composition and 864.00 gram (30 wt. %) PFA were added. The mixture obtained was mixed for a few minutes.

Other samples were made, based on peat (wet) 1830.00 gram (Lab 50 vol. %=Volume/mass) (the peat shows in wet condition containing 98 wt. % a density of 1830 g/dm$^3$) and sandy loam (wet) 1050.00 gram (Lab 50 vol. %) (the sandy loam shows in wet condition containing 67.7 wt. % water a density of 1050 g/dm$^3$) are mixed. This makes a peat/loam sample (wet) 2880.00 gram (1440 g/dm$^3$ wet density mixed soils (50:50)). To the bottom material 18.00 gram additive composition and CEM I 32,5R (Portland Cement) 400.00 gram (13.8 wt. %). This was mixed for a few minutes.

Below, results on the samples with respect to compressive strength and the flexural strength are given:

| Product | UCS (N/mm$^2$) | Flexural strength (N/mm$^2$) |
|---|---|---|
| with fly ash (7 days) | 1.2 | — |
| with cement (7 days) (state of the art construction) | 0.4 | — |
| with fly ash (28 days) | 2.5 | 1.0 |
| with cement (28 days) (state of the art construction) | 1.6 | 0.5 |

EXAMPLE 3

Use of Sludge as Bottom Material in a Construction

In this experiment, laboratory tests on harbor sludge modified with additive composition/OPC/PFA are described. The sludge is obtained from the Jan Rietman sludge depot Boskalis.

The additive composition according to example 5b is added to the sludge. The additive composition is mixed (T=19° C.) and OPC is added and mixed T=20.5° C. After mixing, the mixture is compacted by vibration.

Procedure sludge sample fresh harbor sludge: decantation of the water 2415 g (sludge contains 64.3% water=4885 g). The sludge is divided in three portions of 1628.3 g each. The sludge, particularly after decantation, shows a wet density of 1185 g/dm$^3$. Samples are classified as alpha and beta. The alpha sample code HS-sedi 0-2PCEM/CEMI is treated with 0.2 wt. % additive composition and 20 wt. % Cem I 32,5R. Mixed after each additive for 2 minutes and compacted by vibration table. The beta sample code HS-sedi 0-2PCEM/PFA is treated with 0.2 wt. % additive composition and 50 wt. % Powder Coal Fly ash (PFA). Mixed after each additive for 2 minutes and compacted by vibration table.

All products shows already after 24 hours a fast hardening by increased stiffness. The sludge can be used in order to prepare prefab elements eventual reinforced by a fiber inlay. Strong physical/mechanical behavior can be obtained for construction purposes.

Below, results on the samples with respect to compressive strength and the flexural strength are given:

| Product Code | UCS (N/mm$^2$) | Flexural strength (N/mm$^2$) |
| --- | --- | --- |
| Alpha (28 d) (prior art) | 2.8 | 1.0 |
| Beta (28 d) | 4.8 | 1.9 |

The sludge is highly contaminated and classified as dangerous:

- mineral oil contaminations of approx. 9600 mg/kg d.s. (d.s.: dry substance)
- zinc 2000 mg/kg d.s.
- lead 600 mg/kg d.s.
- Arsenic 46 mg/kg d.s.
- Chrome 150 mg/kg d.s.
- PCB's and PAH's are available in larger concentrations.

The leach out of PCB's and PAH's is greatly diminished when using the construction composition, e.g. when they are present in a construction product.

It appears that the physical properties of the prior art construction product, based on sludge, a cement additive composition and cement has worse properties than the new construction, based on fly ash but without cement.

Similar good properties were obtained with other additive compositions, like e.g. the one described in example 5a.

EXAMPLE 4

Examples of Ashes Used

Ash 1 (Fly ash): The fly ash used comprises 21.96 wt. % silicic acid, calculated with respect to $SiO_2$; 14.6 wt. % aluminum, calculated with respect to $Al_2O_3$; 0.9 wt. % iron, calculated with respect to $Fe_2O_3$; 39.75 wt. % calcium, calculated with respect to CaO; 23.54 wt. % free calcium, calculated with respect to CaO; 39.75 wt. % magnesium, calculated with respect to MgO; 6.21 wt. % silicic acid, calculated with respect to $SO_3$; 1.81 wt. % soda, calculated with respect to MgO; 1.21 wt. % potassium, calculated with respect to $K_2O$; and 0.02 wt. % chlorine, calculated with respect to Cl. When using a 0.0063 mm sieve, about 89.8 wt % passes.

Ash 2 (Bottom ash) (Filter ash HP SDT (F100)): This bottom ash contains (when dry) about 40 wt. % $SiO_2$; 20. wt. % $Al_2O_3$; 2 wt. % $Fe_2O_3$; 30 wt. % CaO of which 2% free CaO; 5 wt. % MgO; <1 wt. % $SO_3$.

Ash 3 (Fly ash from coal plant; EFA-Füller S-B/F of "Werk Scholven"): This fly ash contains about 53 wt. % $SiO_2$; 28 wt. % $Al_2O_3$; 6.8 wt. % $Fe_2O_3$; 2.7 wt. % CaO (0.07% free CaO); 1.8 wt. % MgO; 0.7 wt. % $SO_3$; 3.3 wt. % C, 3.4 wt. % $K_2O$; 1.2 $TiO_2$ and 0.4 wt. % $P_2O_5$.

EXAMPLE 5

Examples of Additive Compositions Used

Below, some additive composition are described, that can be used in the construction composition of the invention.

| a) | |
| --- | --- |
| Component | Quantity (relative weights) |
| NaCl (techn. pure) | 30 |
| $NH_4Cl$ (techn. pure) | 1 |
| $AlCl_3 \cdot 6H_2O$ (extra pure) | 3 |
| KCl (techn. pure) | 16 |
| $CaCl_2 \cdot 2H_2O$ (techn. pure) | 15 |
| $MgCl_2 \cdot 6H_2O$ (techn. pure) | 16 |
| MgO (pure) | 2 |
| $MgHPO_4 \cdot 3H_2O$ (techn. pure) | 3 |
| $MgSO_4 \cdot 7H_2O$ (techn. pure) | 2.5 |
| $Na_2CO_3$ (techn. pure) | 3 |
| Amorphous $SiO_2$ (5-40 μm) | 1 |

Another example of an additive composition is given below:

| b) | |
| --- | --- |
| Component | Quantity (relative weights) |
| NaCl (techn. pure) | 31 |
| $NH_4Cl$ (techn. pure) | 1 |
| $AlCl_3 \cdot 6H_2O$ (extra pure) | 3 |
| KCl (techn. pure) | 16 |
| $CaCl_2 \cdot 2H_2O$ (techn. pure) | 15 |
| $MgCl_2 \cdot 6H_2O$ (techn. pure) | 16 |
| MgO (pure) | 2 |
| $MgSO_4 \cdot 7H_2O$ (techn. pure) | 3 |
| $Na_2CO_3$ (techn. pure) | 3 |
| Zeolite A4 (Natrolite) | 2.5 |

The construction composition, comprising these additive compositions, may further comprise some cement, like e.g. Portland cement 52.5 R (Blain 530 m$^2$/kg) in an amount of e.g. 0.0-5.0 wt. %, based on the total weight of the construction composition.

The invention claimed is:

1. A construction composition comprising:
   (1) an ash in an amount of 90.0-99.9 wt. %, based on the total weight of the construction composition, wherein the ash is fly ash or bottom ash;

(2) an additive composition in an amount of 0.1-10. 0 wt. %, based on the total weight of the construction composition, wherein the additive composition comprises a component from group (2a) and a component from group (2b), wherein group (2a) consists of metal chlorides and wherein group (2b) consists of silica, zeolite and apatite, and wherein group (2a) comprises 70.0-99.0 wt. % of the total additive composition and group (2b) comprises 1.0-30.0 wt. % of the total additive composition; and (3) cement, in an amount of 0.0-5.0 wt. %, based on the total weight of the construction composition.

2. The construction composition according to claim 1, wherein the metal chloride is selected from the group consisting of sodium chloride, potassium chloride, magnesium chloride, calcium chloride, strontium chloride, barium chloride, ammonium chloride and aluminium chloride.

3. The construction composition according to claim 1, wherein the amount of cement is 0.0-3.0 wt. % of the total construction composition.

4. The construction composition according to claim 1, wherein the ash comprises fly ash.

5. The construction composition according to claim 4, wherein the ash comprises powder coal fly ash.

6. The construction composition according to claim 1, wherein the metal chloride comprises sodium chloride and calcium chloride.

7. The construction composition according to claim 1, wherein the metal chloride comprises sodium chloride, potassium chloride, magnesium chloride, calcium chloride, ammonium chloride and aluminium chloride.

8. The construction composition according to claim 1, wherein the additive composition further comprises a component selected from the group consisting of magnesium oxide and calcium oxide.

9. The construction composition according to claim 1, comprising a bottom material selected from the group consisting of soil, sand, sludge, gangue, mud, peat, loam and clay.

10. A method for making a construction composition comprising:
(1) providing an ash, wherein the ash is fly ash or bottom ash;
(2) providing an additive composition, wherein the additive composition comprises a component from group (2a) and a component from group (2b), wherein group (2a) consists of metal chlorides and wherein group (2b) consists of silica, zeolite and apatite, and wherein group (2a) comprises 70.0-99.0 wt. % of the total additive composition and group (2b) comprises 1.0-30.0 wt. % of the total additive composition; such that the weight of the ash is 90.0-99.9 wt. %, based on the total weight of the construction composition and the weight of the additive composition is 0.1-10.0 wt. %, based on the total weight of the construction composition;
(3) mixing the ash and the additive composition.

11. A method for making a construction product, comprising:
(1) providing a bottom material selected from the group consisting of soil, sand, sludge, gangue, mud, peat, loam and clay;
(2) providing a construction composition according to claim 1 in an amount such that the weight of the construction composition comprises 10-95 wt. % (wet weight) of the bottom material;
(3) mixing the bottom material and the construction composition;
(4) drying the mixture obtained in step (3).

12. The method according to claim 11, wherein cement is added to the mixture obtained in step (3) in an amount such that the weight of the cement comprises 0.5-10 wt. % (wet weight) of the mixture obtained in step (3).

13. The method according to claim 11, wherein the weight of the cement comprises 3-5 wt. % (wet weight) of the mixture obtained in step (3).

14. A construction composition obtainable by the method according to claim 10.

15. A construction product obtainable by the method according to claim 11.

16. The construction composition according to claim 9, having a compressive strength of at least 1.2 N/mm2.

17. A method of consolidating bottom material, comprising the step of using a construction composition according to claim 1 for consolidating the bottom material, the bottom material selected from the group consisting of soil, sand, sludge, gangue, mud, peat, loam and clay.

18. The construction composition according to claim 2, wherein the amount of cement is 0.0-3.0 wt.% of the total construction composition.

19. The method according to claim 12, wherein the weight of the cement comprises 3-5 wt. % (wet weight) of the mixture obtained in step (3).

* * * * *